United States Patent [19]

Moriyama et al.

[11] Patent Number: 4,739,161

[45] Date of Patent: Apr. 19, 1988

[54] FINE DISPLACEMENT TRANSDUCER EMPLOYING PLURAL OPTICAL FIBERS

[75] Inventors: Shigeo Moriyama, Tama; Fumihiko Uchida, Hachioji, both of Japan

[73] Assignee: Hitachi, Ltd., Tokyo, Japan

[21] Appl. No.: 870,814

[22] Filed: Jun. 5, 1986

[30] Foreign Application Priority Data

Jun. 13, 1985 [JP] Japan .................................. 60-127158

[51] Int. Cl.[4] ................................................ H01J 5/16
[52] U.S. Cl. ................................... 250/227; 250/231 R
[58] Field of Search ............... 250/227, 231 R, 231 P; 73/705; 356/1, 4

[56] References Cited

U.S. PATENT DOCUMENTS 3,778,157  12/1973  Brelot et al. .............................. 356/1
3,792,928   2/1974  Poilleux ................................... 356/4
4,358,960  11/1982  Porter ................................... 250/227
4,599,711   7/1986  Cuomo .................................. 250/227
4,617,460  10/1986  Tokunaga et al. ...................... 250/227

Primary Examiner—David C. Nelms
Attorney, Agent, or Firm—Antonelli, Terry & Wands

[57] ABSTRACT

A fine displacement transducer, wherein either end of a first and a second optical fibers which are mutually adjacent are respectively provided in alignment with each other opposed to the reflection surface and the illuminating light is made incident from the one end of the first optical fiber and the light irradiated from the other end of the first optical fiber is made to illuminate its reflection surface, while the reflected light therefrom is received by the second optical fiber, so that the amount of displacement of the reflection surface relative to both end surfaces of the second optical fiber can be detected from the variation of intensity of the received light, and a measuring system wherein the reflected light from the reflection surface is received by either of the second or a separately provided third optical fiber to detect the intensity of received light for converting it into the electric signal.

7 Claims, 6 Drawing Sheets

FINE DISPLACEMENT TRANSDUCER EMPLOYING PLURAL OPTICAL FIBERS

BACKGROUND OF THE INVENTION

1. Field of the Invention

The present invention relates to a device for detecting a fine displacement of a target by utilizing the reflecting rays and more specifically to an improvement of the detector which, by using optical fibers, detects the fine displacement of the target from the intensity of reflected light.

2. Description of Prior Art

Figure 10:
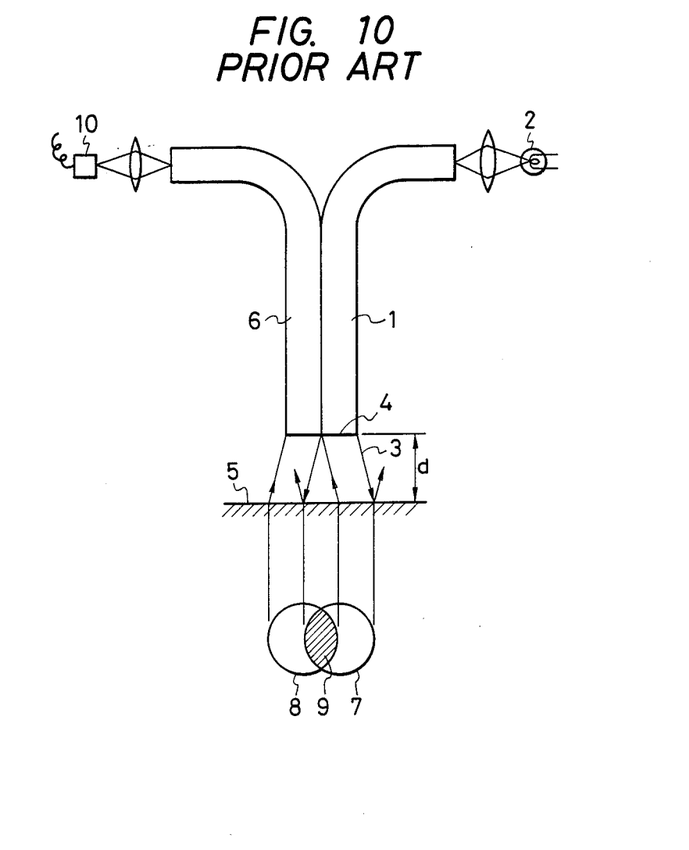
FIG. 10 shows an explanatory view of the measuring principle according to a fine displacement transducer of prior art.
Figure 11:
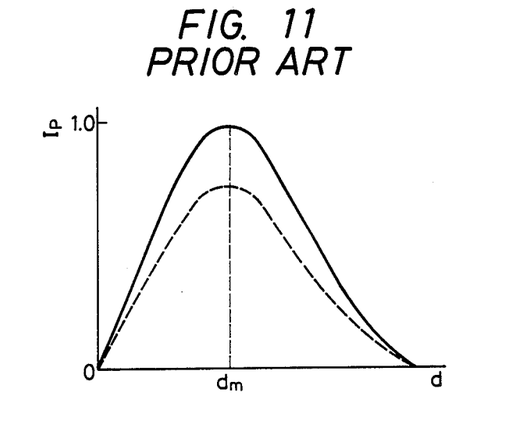
FIG. 11 shows a graphic view, illustrating a displacement detecting characteristic of the above transducer.

An instrument is known which uses optical fibers, allowing a fine displacement of a few of microns to be detected in a noncontact manner. (See R. O. Cook and C. W. Hamm "Fiber Optic Lever Displacement Transducer") The measuring principle is hereinafter described with reference to FIG. 10. In FIG. 10, two optical fibers are provided in such a way that fibers are adjacent end- to end each other. Of two optical fibers, the light from the light source 2 is made incident to one end of an illuminating fiber 1, while a cone like beam of illuminating light 3 extending from the other end is made to irradiate. When a reflection surface 5 is placed by a distance spaced apart from an irradiance plane 4 of fiber 1, the illuminating light beam 3 is reflected and a part of the light is made incident to the end surface of the light receiving optical fiber 6. Hereby a zone 7 which is illuminated on the reflection surface 5, as shown in FIG. 10, takes a rectangular form, while a zone 8 where the light receiving fiber 6 can receive the light also takes the same rectangular form. Consequently, of the zone 7 occupied by the illuminating light, the zone where rays are reflected and come into the light receiving optical fiber 6 occupies a hatched part 9 only. Since the illuminating intensity and the size of area of this hatched part 9 is varied in correspondence to the distance d, the value of distance can be known by detecting the amount of rays coming into the light receiving optical fiber 6 by means of a photodetector 10 provided at the other end of the optical fiber. Example of relationship between this distance d and the intensity Ip of the light receiving signal is shown in FIG. 11. In FIG. 11, the intensity of light Ip is increased substantially linearly with the increase of distance d, saturated at a certain point and is thereafter inversely decreased. The distance dm where the intensity of light Ip becomes the greatest depends on the radius and the numerical apertures of the optical fiber, amounting approximately to a value 1.5 times as great as the radius of the optical fiber. When the optical fiber having a radius of about 50 $\mu$m is used, a fine displacement of about 0 to 30 $\mu$m can be detected substantially linearly with the resolution above 0.1 $\mu$m.

However, according to the above-mentioned method, as seen from the detecting principle, when the intensity of source of light 2 is fluctuated or the reflection coefficient of reflection surface 5 is varied, since the intensity of light Ip is varied as shown in FIG. 11 by the broken line with respect to the displacement (distance d), the detecting sensitivity of displacement must be corrected each time the ditection is made. Namely, in prior devices, it has been indispensable to correct the intensity of light source 2 and the reflection coefficient of the reflection surface 5 just prior to their use, which has made the operation extremely complicated.

Besides, in prior devices, in case the reflection coefficient of reflection surface is unknown, it has been necessary to previously obtain the relationship between the displacement and the light intensity Ip to obtain knowledge of the reflection coefficient in advance and to proceed to the above-mentioned manipulation.

Further, in prior devices, in case the reflective target plane is moved in the direction other than the measuring direction and the reflection coefficient of the reflective target plane to be detected is not uniform but is varied little by little, the detected result can include two adverse factors, the varied displacement and the varied reflection coefficient, as the result of which, if the displacement is sought directly from the detected result, measuring errors could arise.

An object of the present invention is therefore to eliminate disadvantages caused in the above prior art and to provide a fine displacement transducer which allows the displacement to be detected without undergoing the adverse effect caused by the varied reflection coefficient of reflective surface or the fluctuation of intensity of light source.

SUMMARY OF THE INVENTION

According to the present invention, there is proposed a fine displacement transducer, wherein either of end surfaces of a first and a second optical fibers which are mutually adjacent are respectively provided in alignment with each other oppose to the reflection surface and the illuminating light is made incident upon one end of the first optical fiber and the light irradiated from the other end of the first fiber is illuminated onto the its reflection surface, while the reflected light therefrom is received by the second optical fiber, so that the amount of displacement of the reflection surface relative to both end surfaces of the second optical fiber can be detected from the variation of intensity of the received light, characterized in that it is provided with a detection system wherein the reflected light from the reflection surface is received by either of the second or a separately provided third optical fiber to detect the intensity of received light for converting it into the electric signal.

According to a preferred embodiment of the present invention, there is provided a fine displacement transducer, wherein either of end surfaces of adjacent first and second optical fibers are made opposed to the reflection surface of the light in alignment with each other, the illuminating light from the source of light is made incident into the other end surface of said first optical fiber, said illuminating light irradiated from one of end surfaces of said first optical fiber being made to reflect against said reflection surface to obtain a first reflected light, said first reflected light being made incident into one of end surfaces of said second optical fiber to make said first reflected light irradiate from the other end surface of said second optical fiber, a first photodetector for detecting a signal $S_1$ of said first reflected light irradiated, said signal $S_i$ being $$S_1 = C_1 \cdot I \cdot r \cdot d \qquad (A)$$

where:
$C_1$: constant,
I: intensity of light from said source of light,
r: reflection coefficient of said reflection surface, d: distance between said reflection surface and either of end surfaces of said first and second optical fibers, and a distance between said reflection surface, and either of end surfaces of said first and second optical fibers being detected in accordance with the signal $S_1$ of said first reflected light, characterized in that said first reflected light is made incident into one of end surfaces of said optical fiber and said first reflected light is made to irradiate from the other end surface of said first optical fiber, a second detector being provided for detecting the signal $S_2$ of said first reflected light irradiated, whereby:

$$S_2 = C_2 \cdot I \cdot r(d_2' - d) + C_2' \cdot I \quad \text{(B)}$$

where:

$C_2, C_2'$: constants $C_2 \cdot I \cdot d_2'$: component of the intensity of the signal $S_2$ when $d=0$, a third detector being provided for making a portion of illuminating light from said source of light reflect against the other end surface of said first optical fiber, and for detecting the signal $S_3$ of this second reflected light, whereby:

$$S_3 (\text{signal of said second reflected light}) = C_3 \cdot I \quad \text{(C)}$$

where: $C_3$ : constant, and an arithmetic means being provided for computing the distance between said reflection surface and either of said end surfaces of said first and second optical fibers.

According to another embodiment of the present invention, there is provided a detector for detecting the fine displacement, wherein a first photodetector is provided, in which either of end surfaces of adjacent first and second optical fibers are made opposed respectively to the reflection surface of the light in alignment with each other, the illuminating light from the source of light is made incident into the other end surface of said first fiber, said illuminating light irradiated from one of end surfaces of said fiber is made to reflect against said reflection surface, said reflected light being made incident into the one of end surfaces of said second fiber to detect the intensity $Ip_1$ of said irradiating light, and in accordance with said intensity $Ip_1$, the distance dx is detected between said reflection surface and either of end surfaces of said first and second optical fibers, characterized in that a third optical fiber is provided adjacent said first and second optical fibers, one of end surfaces of said third optical fiber being disposed in such a way that the distance between said third optical fiber and one of end surfaces of one of said first and second optical fibers may attain a predetermined value $d_0$, a second photodetector is provided which makes said reflected light incident into one of end surfaces of said third optical fiber, while said reflected light making said reflected light incident upon the other end surface of said third optical fiber to detect the intensity $Ip_2$ of said irradiating light, and computing means for computing $$dx = \frac{Ip_2}{Ip_2 - Ip_1} \cdot d_0$$

DESCRIPTION OF PREFERRED EMBODIMENTS

An embodiment of the present invention is hereinafter described in more detail with reference to the appended drawings.

Embodiment 1

Figure 1:
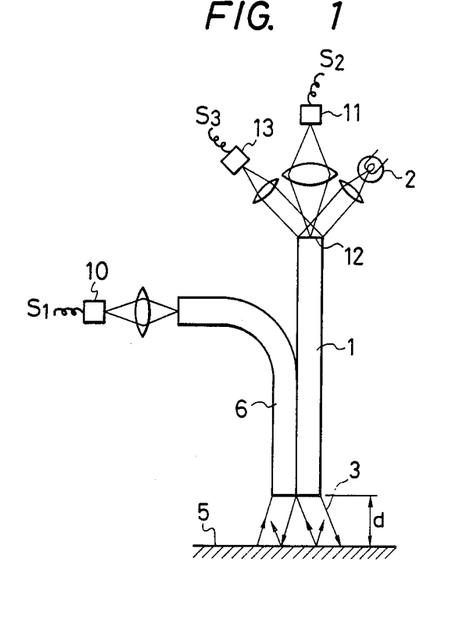
FIG. 1 shows an explanatory view of the measuring principle according to one embodiment of a fine displacement transducer according to the present invention.

The present embodiment relates to the one having a detection system wherein the reflected light is received by the optical fiber at the light emitting side. In FIG. 1, the light of irradiating source 2 is a parallel one, obliquely coming into the light incoming end surface 12 of the optical fiber at the light emitting side. This incident angle of light is necessary to be set within the smaller extent than the aperture angle of optical fiber at the light emitting side. The beam of light 3 incident upon the fiber 1 at the light emitting side is reflected against the reflection surface 5 and a portion of the reflected light, as in the prior device illustrated in FIG. 1, comes into the fiber at the light receiving side and is converted by the photodetector 10 into the signal $S_1$ corresponding to the distance d. On the other hand, a portion of the reflected light of the beam comes again into the fiber at the light emitting side and is converted into the signal $S_2$ by the photodetector 11 which is provided at the side of the light incoming end surface 12. Further, of the parallel beam emitted from the source 2, a slight light reflected against the light incoming end surface of the fiber at the light emitting side is converted into the signal $S_3$ by the photodetector 13. This signal $S_3$ is proportional to the intensity of light of the source 2.

Figure 2:
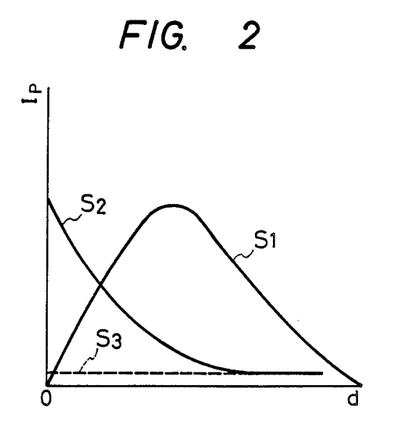
FIG. 2 shows a graphical view, illustrating characteristics of three detected signals according to the embodiment 1.

FIG. 2 shows a relationship between the intensity Ip of those signals $S_1$, $S_2$ and $S_3$ and the detection distance d. The signal $S_1$, as in the prior device, is the one in which Ip is substantially proportional to d, while the detection distance d is smaller. The signal $S_2$ exhibits a maximum value when the detected distance is zero, and becomes substantially linearly smaller as d increases. However, even if the detected distance becomes infinitely great, the signal does not generally become zero and the signal remains having such an intensity as will correspond to the light coming back by being reflected against the end surface at the light emitting side of the optical fiber at the light emitting side. The signal $S_3$ is the one which depends solely on the intensity of the light source 2, showing a constant value independently of the detected distance d.

If the intensity of the light source 2 and the reflectance of the reflection surface 5 are respectively taken as I and r, three signals $S_1$, $S_2$ and $S_3$ can be expressed as follows in the range in which the detected distance d is sufficiently small.

$$S_1 = C_1 \cdot I \cdot r \cdot d \quad (1)$$

$$S_2 = C_2 I \cdot r(d_2' - d) + C_2' \cdot I \quad (2)$$

$$S_3 = C_3 \cdot I \quad (3)$$

where: $C_1$, $C_2$, $C_2'$ and $C_3$ are respectively constants. $C_2 \cdot I \cdot r \cdot d_2'$ in the signal $S_2$ denotes the intensity when the detected distance d is zero.

The signal $S_2$ in the above expression (2) includes a component of the above residual signal $C' \cdot I$, but the following signal which is proportional to the reflectance can be obtained by subtracting the value obtained by multiplying the signal $S_3$ by the coefficient $k_3 = C_2'/C_3$.

$$S_2' = C_2 \cdot I \cdot r(d_2' - d) \quad (4)$$

Figure 3:
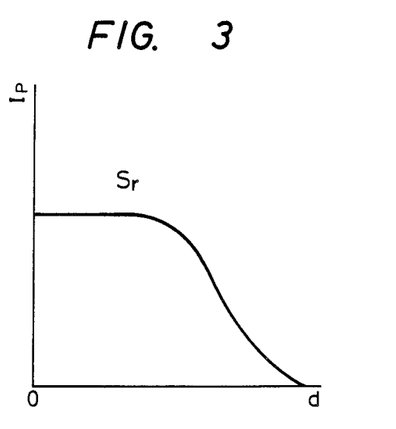
FIG. 3 shows a graphical view of the characteristics of reflection coefficient signals according to the embodiment 1.

If the signal $S_2'$ thus obtained is multiplied by the coefficient $k_2 = C_1/C_2$, and the signal Sr is created by adding the signal $S_1$ to this value, $$Sr = S_1 + k_2 S_2' = C_1 \cdot I \cdot r \cdot d_2' \quad (5)$$

which, as shown in FIG. 3, allows the signal to be obtained which does not depend on the detected distance d, but solely on the intensity of source 2 and the reflection coefficient r. Hereby, since the intensity I of source 2 can be deduced from the signal $S_3$, if the signal Sr is divided by the signal $S_3$ or the magnitude of the intensity I of the source 2 can be known, the reflection coefficient r can be obtained.

As described above, according to the present embodiment, the reflection coefficient of the reflection surface to be detected can be detected independently of the detected distance by using the optical fiber for detecting the distance instead of the special one for detecting the reflection, allowing the detection sensitivity to be extremely easily corrected. Furthermore, by attaching the automatic correction circuit, the variation of reflection coefficient can be automatically corrected, so that a constant sensitivity for detecting the distance can be constantly obtained.

Figure 4:
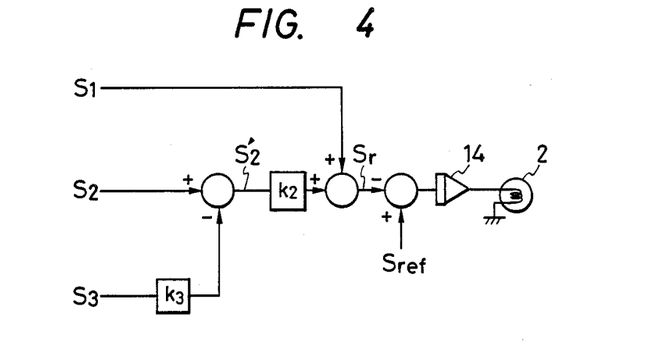
FIGS. 4 and 5 show circuit diagrams in the embodiment, respectively illustrating an example of circuit which performs the automatic correction of reflection coefficient.

FIG. 4 shows one example of the above described automatic adjustment circuit. This circuit is constructed so that the signal Sr which is proportional to the reflectance is created in accordance with the above-described method from three signals $S_1$, $S_2$ and $S_3$ and this is compared with the reference signal Sref and the result of operation is integrated by the integrator 14 and the intensity of light source 2 can be controlled in accordance with the integrated value. As the case may be, means for driving the source 2 is provided between the integrator 14 and the light source 2. Since this is constructed in the closed loop system, that is actuated in such a way the value of signal Sr may coincide constantly with the value of signal Sref. Namely, the intensity of light source is varied depending on the variation of reflectance of the reflection surface and a constant intensity of the reflected light can be obtained, as the result of which the distance detecting signal obtained as the signal $S_1$ exhibits a constant sensitivity.

Figure 5:
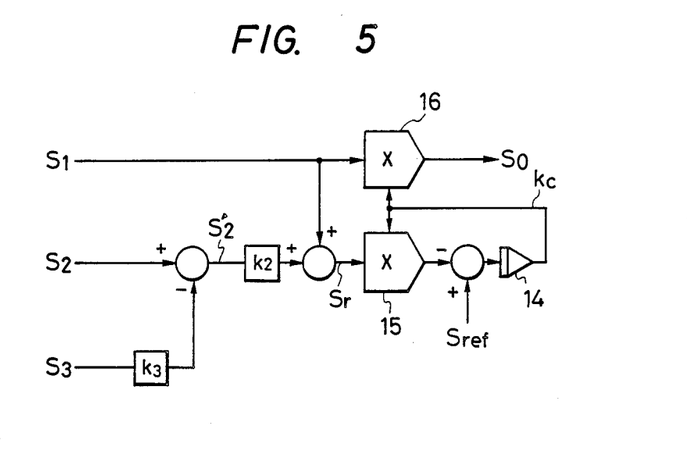

As the automatic adjustment circuit, as shown in FIG. 5, instead of controlling the intensity of the source, the gain of detection circuit may be adjusted by using two multipliers. Namely, as in the example of FIG. 4, the signal Sr is compared with the reference signal Sref and the difference therebetween is integrated by using the integrator 14. This integrated value kc is offered to two multipliers 15 and 16, multiplying signals Sr and $S_1$ respectively by kc. The integrator 14 performs an integrating operation, so that the output kc. Sr of the multiplier 15 may coincide with the reference signal Sref. The above integrated value kc is a relevant value to the reflectance and kc·r always becomes constant. Thus, if the signal $S_0$ obtained by multiplying the signal $S_1$ by kc is taken out from the multiplier 16, this will prove to be a distance detecting signal whose variation of reflectance is corrected.

Though, in the above description, the intensity of source 2 is assumed to fluctuate and the reflection signal Sr is computed including the signal $S_3$, the signal $S_3$ may be fixed at a proper certain value when the intensity of source 2 is stable.

Embodiment 2

In the present embodiment, in addition to the prior device illustrated in FIG. 10, a second optical fiber is provided at the light receiving side and the relected light is received by this fiber.

Figure 6:
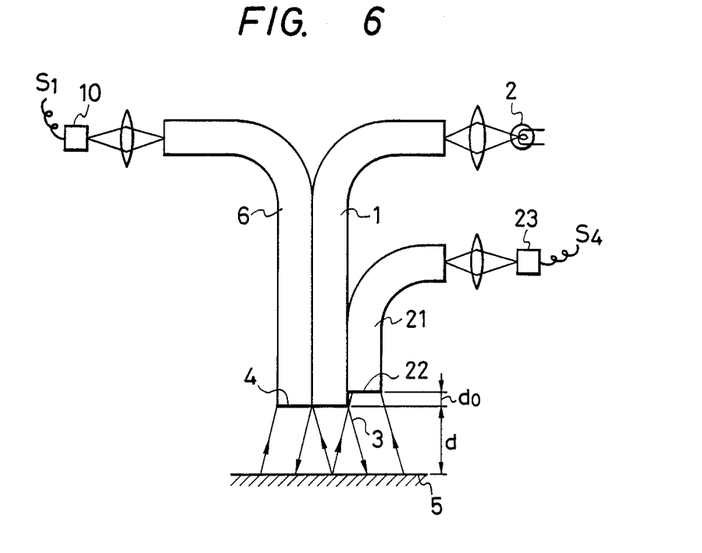
FIG. 6 shows an explanatory view of the measuring principle of embodiment 2 of the fine displacement transducer according to the present invention.
Figure 7:
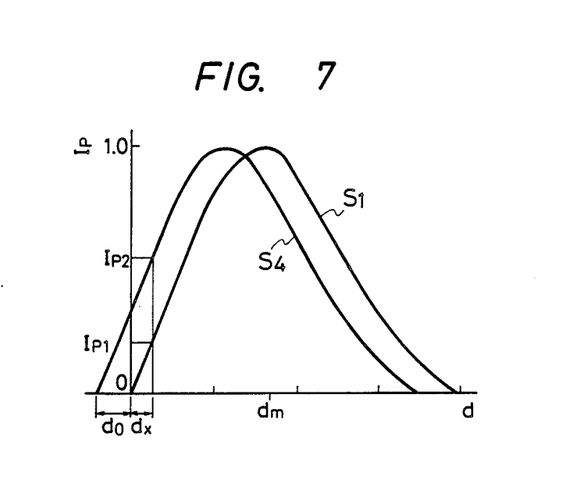
FIG. 7 shows a graphic view of characteristics, illustrating detection characteristics according to the embodiment 2.

In FIG. 6, the second fiber 21 at the light receiving side is provided, so that its end surface may be located at a position as offset upwardly or downwardly by the distance $d_0$ from the end surface 4 of the first fiber 6 at the light receiving side. Consequently, in case it is offset e.g., upwardly, the signal of photodetector 23 exhibits a characteristic as shown by $S_4$ in FIG. 7 in response to the displacement d. $S_1$ in FIG. 7 denotes a detected signal by the first light receiving fiber 6, i.e., the characteristic of signal S proves to be a parallel shift of the characteristic of the signal $S_1$ by the distance $d_0$. Thus in the fine range of detection wherein the light receiving intensity Ip exhibits a linear relationship relative to the detected distance d (d < dm, By dm is meant a distance at which the light receiving intensity Ip of $S_1$ becomes the greatest.), the following relationship can be obtained:

$$\frac{d_0}{I_{p2} - I_{p1}} = \frac{dx}{I_{p1}} \quad (6)$$

where: dx is an unknown distance and from the expression (6) dx can be obtained as:

$$dx = \frac{I_{p1}}{I_{p2} - I_{p1}} \cdot d_0 \quad (7)$$

Hereby, since the magnitude of signals $S_1$ and $S_2$ is varied respectively with the same coefficient as the intensity of light source 2 and the reflection coefficient of reflection surface 5 are varied, the relationship specified in the expression (7) can hold good irrespective of the magnitude of signals $S_1$ and $S_4$.

Figure 8:
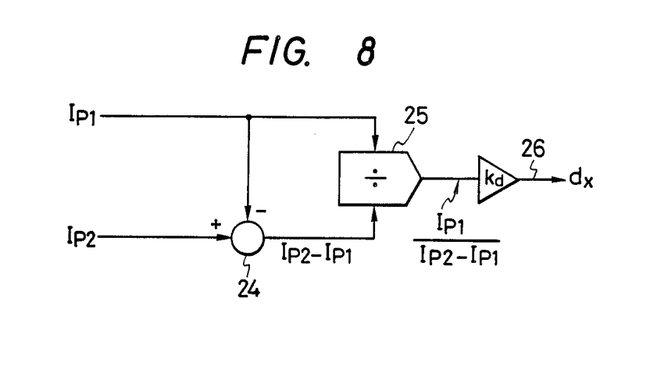
FIGS. 8, 9 and 12 show respectively a circuit diagram, illustrating an example of the signal processing circuit used in the embodiment 2.

One example of the signal processing circuit is shown in FIG. 8, which is used for detecting the distance dx in accordance with the above-described relationship. In FIG. 8, first of all, signals $I_{p2} - I_{p1}$ are created by using a subtractor 24, while operation signals $I_{p1}/I_{p2} - I_{p1}$ are created by using a divider 25. By multiplying this signal by the coefficient kd which imparts a signal level corresponding to the certain distance $d_0$, the detection signal 26 corresponding to the unknown signal dx can be obtained.

Figure 9:
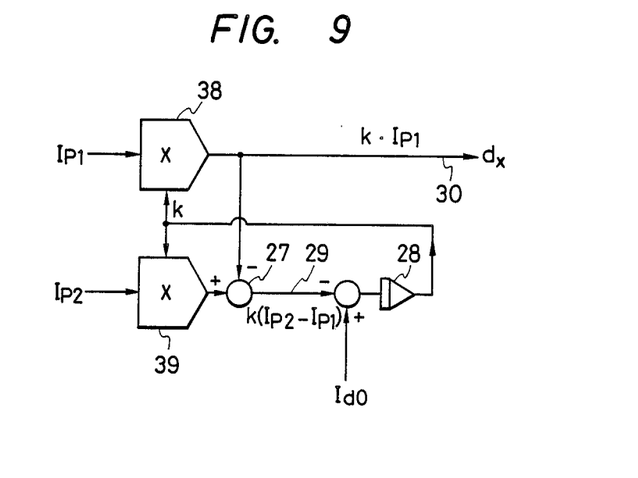

Furthermore, as another example of the signal processing circuit, as shown in FIG. 9, signals $I_{p2}$ to $I_{p1}$ corresponding to the certain distance d are created by using the subtractor 27 and the magnitude of those signals are compared with the reference value $Id_0$ and the result thus obtained is integrated by the integrator 28. The output of integrator 28 is input as the coefficient k to multipliers 38 and 39 to multiply the magnitude of detected signals $I_{p1}$ and $I_{p2}$ respectively by k. Since this circuit is an open loop, it comes into the steady state after the signal 29 i.e., $k(I_{p2} - I_{p1})$ is actuated until it coincides with $Id_0$. This means that the sensitivity of detector is automatically adjusted by the correction of variation of the intensity of the source 2 and the variation of the reflectance of the reflection surface 5, so that the signal intensity corresponding to the constant distance d may be always constant. Thus, if the signal 30, i.e., k.Ip corresponding to the unknown distance dx is taken out, the correct value can be constantly detected without being affected by the fluctuation of intensity of the light source or by the variation of reflectance of the reflection surface.

Figure 12:
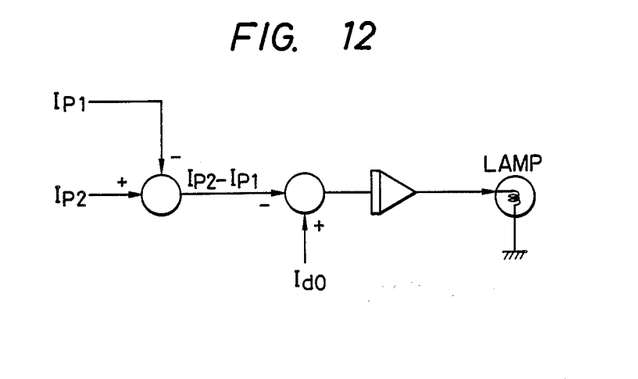

In the correction method shown in FIG. 9, as shown above, instead of adjusting the sensitivity of the detection system by multipliers 38 and 39, the light emiting intensity of the light source may be adjusted to obtain the same effect. The construction for that is shown in FIG. 12.

In describing the above embodiments 1 and 2, the fiber at the light emitting side as well as the first and second fibers at the light receiving side are assumed to be made of a strand, but, as known, a bundle of a plurality of strands may be used without nullifying the advantage of the present invention.

As described above, according to the present invention, a fine displacement can be detected with a high accuracy without undergoing the adverse effect caused by the variation of reflectance of the reflection surface or the fluctuation of the intensity of the illuminating source. Furthermore, since the detector according to the present invention is not subjected, as shown above, to any effect of the reflection coefficient of reflection surface, the fine displacement can be detected through an easy operation and with a high reliability even in case the reflection coefficient of the reflection surface is unknown and in case the reflective target plane to be tested is shifted in the direction other than the detecting one as well as the reflection coefficient of the reflection surface to be tested is varied little by little.

What is claimed is:

1. A fine displacement transducer comprising first and second light guide means having first and second end surfaces, said first end surfaces of said first and second light guide means being respectively opposed to a reflection surface for light, light source means disposed for providing illuminating light incident upon said second end surface of said first light guide means, said first light guide means irradiating said incident light from said first end surface thereof so as to irradiate said reflection surface and form a first reflected light, at least a portion of said first reflected light being made incident upon said first end surface of said second light guide means and said second light guide means irradiating said incident first reflected light from said second end surface thereof, first detector means disposed for detecting the intensity of the irradiating light from said second end surface of said second light guide means, said second end surface of said first light guide means reflecting a portion of said illuminating light from said light source means incident thereon as a second reflected light, second detector means being disposed for detecting the intensity of said second reflected light from said second end of said first light guide means, another portion of said first reflected light reflected by said reflecting surface being incident upon said first end surface of said first light guide means and said light guide means irradiating said incident first reflected light from said second end surface thereof, third detector means being disposed for detecting the intensity of the irradiated light from said second end surface of said first light guide means, arithmetic means for detecting the distance between said first end surface of at least one of said first and second light guide means and said reflection surface in accordance with the detected intensity of said irradiated light from said second end surface of said second light guide means detected by said first detector means, and means for correcting an error of said detected distance caused by at least one of the fluctuation of intensity of said illuminating light and the variation of reflection coefficient of said reflection surface in accordance with the light intensity detected by said first, second and third detector means.

2. A fine displacement transducer comprising first and second adjacent optical fibers, wherein first end surfaces of said adjacent first and second optical fibers are in alignment with each other and are arranged in opposition to a reflection surface for light, illuminating light from a source of light is made incident into a second end surface of said first optical fiber, said illuminating light being iradiated from said first end surface of said first optical fiber and being made to reflect against said reflection surface to obtain a first reflected light, said first reflected light being made incident upon said first end surface of said second optical fiber so that said first reflected light is irradiated from a second end surface of said second optical fiber, a first photodetector being disposed for detecting a signal $S_1$ of said first reflected ligh irradiated from said second end surface of said second optical fiber, said signal $S_1$ being $$S_1 = C_1 \cdot I \cdot r \cdot d \quad (A)$$

where:
$C_1$: constant,
$I$: intensity of light from said source of light,
$r$: reflection coefficient of said reflection surface,
$d$: distance between said reflection surface and at least one of said first end surfaces of said first and second optical fibers, and a distance between said reflection surface, and at least one of said first end surfaces of said first and second optical fibers being detected in accordance with the signal $S_1$ of said first reflected light, said first reflected light being made incident upon said first end surface of said first optical fiber so that said first reflected light is irradiated from said second end surfaces of said first optical fiber, a second photodetector being disposed for detecting a signal $S_2$ of said first reflected light irradiated from said second end surface of said first optical fiber, whereby:

$$S_2 = C_2 \cdot I \cdot r(d_2' - d) + C_2' \cdot I \quad (B)$$

where:

$C_2, C_2'$: constants $C_2 \cdot I \cdot r \cdot d'$: *component of the intensity of the signal $S_2$* when $d=0$, a third photodetector being disposed for receiving a portion of the illuminating light from said source of light reflected from said second end surface of said first optical fiber as a second reflected light, and for detecting a signal $S_3$ of said second reflected light, whereby:

$$S_3 \text{ (signal for said second reflected light)} = C_3 \cdot I \quad (C)$$

where:

$C_3$: constant and an arithmetic means being provided for computing the distance between said reflection surface and at least one of said first end surfaces of said first and second optical fibers on the basis of the expressions (A), (B) and (C).

3. A fine displacement transducer as defined in claim 2, wherein said arithmetic means computes a signal $S_2'$ which is obtained by multiplication of, the signal $S_3$ in the expression (C) by a coefficient $k_3 = C_2'/C_3$ and by subtraction of the value thus obtained from $S_2$ in the expression (B), whereby:

$$S_2' - C_2 \cdot I \cdot r(d_2' - d),$$

said arithmetic means computing a signal Sr which is obtained by multiplication of the signal $S_2'$, by a coefficient $k_2 = C_1/C_2$ and by the addition of the signal $S_1$ to the value thus obtained, whereby:

$$Sr = C_1 \cdot I \cdot r \cdot d_2',$$

and means for computing said distance d in accordance with the signal Sr.

4. A fine displacement transducer, as defined in claim 2, wherein said arithmetic means comprises:
(1) computing means for computing a signal $S_2'$ which is obtained by multiplication of the signal $S_3$ by a coefficient $k_3 = C_2'/C_3$ and by, subtraction of the value thus obtained from, the signal $S_2'$ whereby:

$$S_2' - C_2 \cdot I \cdot r(d_2' - d);$$

(2) means for computing a signal Sr which is obtained by the multiplication of the signal $S_2'$ by a coefficient $k_2 = C_1/C_2$ and by addition of the value this obtained to the signal $S_1$, whereby:

$$Sr = C_1 \cdot I \cdot r \cdot d_2'; \text{ and}$$

(3) control means for controlling the intensity of light of said source of light, wherein the signal Sr is subtracted from a signal Sref which serves as a reference signal for the signal Sr and which is held at predetermined level, the obtained subtracted signal being input to an integrator to control the intensity of light of said source of light in accordance with the output of said integrator.

5. A fine displacement transducer as defined in claim 2, wherein said arithmetic means comprises:
(1) first computing means for computing a signal $S_2'$ which is obtained by multiplication of the signal $S_3$ by a coefficient $k_3 = C_2'/C_3$ and by, subtraction of the value thus obtained from the signal $S_2'$ whereby:

$$S_2' - C_2 \cdot T \cdot r(d_2' - d);$$

(2) second computing means for computing a signal Sr which is obtained by multiplication of the signal $S_2'$ by a coefficient $k_2 = C_1/C_2$ and by addition of the signal $S_1$ to the value thus obtained, whereby:

$$Sr = C_1 \cdot I \cdot r \cdot d_2';$$

(3) first means for inputting said signal Sr to one of the input terminals of a first multiplier, subtracting an output of said first multiplier from a signal Sref and inputting the subtracted signal output to an integrator;
(4) second means for inputting the output of said integrator to an other of the input terminals of said first multiplier;
(5) third means for inputting the signal $S_1$ to one of the input terminals of a second multiplier; and
(6) fourth means for inputting the output of said integrator to another of the input terminals of said second multiplier.

6. A fine displacement transducer as defined in claim 2, wherein said arithmetic means comprises:
(1) first computing means for computing a signal $S_2'$ which is obtained by multiplication of the signal $S_3$ by a coefficient $k_3 = C_2'/C_3$ and by subtraction of the value thus obtained, from the signal $S_2'$ whereby:

$$S_2' - C_2 \cdot I \cdot r(d_2' - d);$$

(2) second computing means for computing a signal Sr which is obtained by multiplication of the signal $S_2'$ by a coefficient $k_2 = C_1/C_2$ and by addition of the signal $S_1$ to the value thus, obtained, whereby:

$$Sr = C_1 \cdot I \cdot r \cdot d_2'; \text{ and}$$

(3) control means for controlling the intensity of said illuminating light which comes into said first optical fiber in accordance with the value of the signal Sr.

7. A fine displacement transducer as defined in claim 2, wherein said arithmetic means comprises:
(1) first computing means for computing a signal $S_2'$ which is obtained by multiplication of the signal $S_3$ by a coefficient $k_3 = C_2'/C_3$ and by, addition of the value thus obtained from the signal $S_2'$ whereby:
$$S_2' - C_2 \cdot I \cdot r(d_2' - d);$$

(2) second computing means for computing a signal Sr which is obtained by multiplication of the signal $S_2'$ *by a coefficient* $k_2 = C_1/C_2$ and by addition of the signal $S_1$ to the value thus, obtained, whereby:
$$Sr = C_1 \cdot I \cdot r \cdot d_2'; \text{ and}$$

(3) means for adjusting said illuminating light in accordance with the signal Sr.

* * * * *